UNITED STATES PATENT OFFICE.

CYRIL BACKUS CLARK, OF NEW YORK, N. Y., ASSIGNOR TO THOMSEN CHEMICAL CO., OF BALTIMORE, MARYLAND, A CORPORATION OF MARYLAND.

AGRICULTURAL SPRAYING.

1,263,856.

Specification of Letters Patent.

Patented Apr. 23, 1918.

No Drawing.

Application filed September 10, 1914. Serial No. 861,012.

*To all whom it may concern:*

Be it known that I, CYRIL BACKUS CLARK, a citizen of the United States, and a resident of the borough of Manhattan, city, county, and State of New York, have invented certain new and useful Improvements in Agricultural Spraying, of which the following is a specification.

My invention relates to the preparation and employment of a spray material adapted for the spraying of fruit trees, shade trees, shrubs, truck-crops and other or similar plants for the purpose of killing injurious insects, mites, fungus growth or similar infesting growth or growths, or to prevent or mitigate conditions produced by them or any of them; among such infesting growths, I include the San Jose scale, the oyster shell scale, the red spider, the apple leaf scab, the apple leaf spot and other similar plant afflictions, pests or affections.

I have discovered that a substance containing barium tetrasulfid, when properly commingled and treated with water, and applied in the form of a spray in the manner usual for such applications, to the affected plants, is an efficient remedy for such plant afflictions as the San Jose scale, the oyster shell scale, which are insects, and the apple scab and the apple leaf spot, which are fungus growths.

In the following I illustrate my invention by examples but I desire to be distinctly understood as not being limited by the precise conditions or proportions or amounts therein since these may be altered or changed within wide limits without departing from the spirit, and while obtaining the full effect and benefit of my invention.

*Example I—Producing barium tetrasulfid.*

Place in an open boiler, fitted with lead steam-coils, 50 lbs. of crude barium sulfid, containing 75% of true barium sulfid; mix therewith 25 lbs. of finely ground brimstone and slowly add thereto 50 gallons of water; boil for a period of three hours; thereupon filter through muslin. The filtrate thus obtained shows about 30 degrees Baumé; transfer this filtrate to a steam-jacketed closed evaporator, evaporate the solution to dryness; a pressure of 80 lbs. of steam in the jacket has been found suitable. This evaporator is provided with a suitable stirrer and operated during the evaporation in such a manner as to prevent the crystals from depositing at or in the bottom; and to be substantially uniformly distributed through the material during this evaporation; a draft is maintained in the evaporator by means of a steam jet so that the condensed water from the evaporator is removed without the introduction of air, that is to say in a non-oxidizing atmosphere; a draft of one half inch of water has been found suitable.

The product thus obtained is in a finely divided state, and dissolves readily in cold water, except for about 5% of insoluble matter, contained therein.

A fair average analysis of this product is as follows:

| | |
|---|---|
| Barium | 45.15% |
| Sulfur | 46.65% |
| Impurities | 1.81% |
| Water | 5.23% |
| | 98.84% |

Interpreting this analysis in the manner customary among chemists the following proximate composition is deduced:

| | |
|---|---|
| $BaS_4H_2O$ | 82.32% |
| Excess sulfur | 9.51% |
| $BaS_2O_3$ | 6.36% |
| Impurities | 1.81% |

It will be noted that my new substance is in the form of a dry, or substantially dry, powder or pulverulent material. This is a condition absolutely unique in this class of materials, all of which are pulps and is one long striven for in this art. It is as efficient as any of the known materials of this same general class, and has the advantage over all of them of being in a concentrated form and relatively very permanent or stable; among the collateral advantages is the absence of inert material in any substantial proportion, thus reducing the cost of shipment and of package and of enabling the user to prepare a spraying material when and in the quantities needed.

In the following examples I illustrate the manner of applying this, my new spray material for the purpose of controlling or destroying the specified plant afflictions:

*Example II—As an insecticide—using against San Jose scale.*

Treat the product of Example I with water and apply the solution so obtained, which may contain a certain amount of suspended matter, to the bark of afflicted plants, while the scale is dormant or semi-dormant, in the manner usual for spraying with, for example, lime-sulfur solution. I have found 10 lbs. to 24 lbs., but preferably 16 lbs., of the product of Example I to 50 gallons of water to be effective against this plant affliction. I have found by suitable experiment upon apple trees and upon peach trees when treated in this manner, that I killed from 98% to 100% of the scale insects present.

*Example III—As an insecticide—using against oyster shell scale.*

Treat 16 lbs. of the product of Example I with 50 gallons of water and apply to the affected plants in the form of a spray during the dormant season or preferably in the spring, just before vegetation starts. The amount of 16 lbs. will be found to be in general satisfactory but this amount may be varied as conditions require.

*Example IV—As a fungicide—using against apple scab and apple leaf spot.*

Stir up from three to six pounds of the product of Example I in 50 gallons of water, and apply in the usual form of a spray to the fruit and foliage of the apple tree; this application is best repeated two or four times during the growing period, depending upon the seasonal and climatic conditions and the susceptibility of the particular variety of tree treated.

*Example V—Combination spray.*

The product of Example I may also be used in combination with other remedies or materials of this kind; for example, arsenate of lead may be added thereto and this combination-spray may be advantageously used during the growing period to protect the fruit and foliage of trees and other plants; for instance, when spraying against apple scab and apple leaf spot, it will be found to be advantageous to add 2 lbs. of arsenate of lead to each 50 gallons of this barium sulfid spray in order to control the codling moth, curculio and other or similar chewing insects.

It will be noted that the product of Example I contains an amount of sulfur in excess of that amount theoretically required by barium tetrasulfid, but the presence of this sulfur in no way interferes with efficiency of the barium compound.

This substance, being not only an insecticide but a fungicide as well, I use the word "insecticide" in this specification and in the thereto attached claims to include also fungicide, and I mean to claim the use of this substance not only as an insecticide or as a fungicide but as both insecticide and fungicide as well.

When in the following claims I refer to a substance containing barium tetrasulfid I mean to include also the substance barium tetrasulfid itself.

When I speak of applying a solution to obnoxious insects, I intend to include in such expression the application to obnoxious vegetable growths, and also the application of the solution to a plant before the insect or spore has actually settled upon such plant, so that the solution will serve to kill the insect or spore when it arrives.

I claim:

1. The improvement in the art of protecting plants against obnoxious insects which comprises applying to such plants a solution, the principal insecticidal ingredient of which is barium tetrasulfid, so that, upon evaporation of the solvent, the barium tetrasulfid remains as a coating upon the plant, substantially as and for the purpose described.

2. An insecticide, the principal insecticidal ingredient of which is barium tetrasulfid in condition suitable for admixture with water to form a spray solution, substantially as described.

In testimony whereof, I have hereunto set my hand in the presence of two subscribing witnesses.

CYRIL BACKUS CLARK.

Witnesses:
 ALFRED J. NOLKA,
 JOHN A. FERGUSON.